United States Patent
Konno et al.

[11] Patent Number: 5,774,264
[45] Date of Patent: Jun. 30, 1998

[54] POLARIZATION INDEPENDENT OPTICAL ISOLATOR

[75] Inventors: Yoshihiro Konno; Shigeaki Aoki; Kazuaki Ikegai, all of Tokyo, Japan

[73] Assignee: Namiki Precision Jewel Co., Ltd., Tokyo, Japan

[21] Appl. No.: 709,626

[22] Filed: Sep. 9, 1996

Related U.S. Application Data

[63] Continuation of Ser. No. 375,297, Jan. 20, 1995, abandoned.

[30] Foreign Application Priority Data

Jan. 28, 1994 [JP] Japan .................................. 6-026048

[51] Int. Cl.$^6$ .............................. G02B 5/30; G02B 27/28
[52] U.S. Cl. ........................ 359/497; 359/282; 359/484; 359/494; 359/499
[58] Field of Search .................................... 359/484, 494, 359/497, 282, 495, 499, 298, 301, 303; 372/703

[56] References Cited

U.S. PATENT DOCUMENTS

| | | | |
|---|---|---|---|
| 5,345,329 | 9/1994 | Shirai et al. | 359/497 |
| 5,381,261 | 1/1995 | Hirai et al. | 359/483 |

FOREIGN PATENT DOCUMENTS

| | | | |
|---|---|---|---|
| 2-44310 | 2/1990 | Japan | 359/484 |
| 2-83522 | 3/1990 | Japan | 359/484 |
| 3-91715 | 4/1991 | Japan | 359/484 |
| 59-44021 | 3/1994 | Japan | 359/484 |

OTHER PUBLICATIONS

Chang et al, Polarization Independent Isolator Using Spatial Walkoff Polarizers, IEEE Photonics Technology Letters, vol. 1, No. 3, Mar. 1989, pp. 68 to 70.

*Primary Examiner*—Paul M. Dzierzynski
*Assistant Examiner*—Darren E. Schuberg
*Attorney, Agent, or Firm*—Sixbey, Friedman, Leedom & Ferguson, PC; Gerald J. Ferguson, Jr.; Eric J. Robinson

[57] ABSTRACT

A polarization-independent optical isolator having a structure in which polarization dispersion is virtually eliminated by selecting the thickness and optical axis orientations of birefringent crystalline plates used in the isolator. The optical isolator of the present invention employs a combination of birefringent crystalline plates wherein the optical axis orientation of at least one birefringent crystalline plate in the optical isolator is different from the optical axis orientation of the remaining birefringent crystalline plates, and the polarization mode dispersion, which is induced when the beam propagates through the birefringent crystalline plate having a different optical axis orientation, is equal to the dispersion rate of the polarization mode dispersion attributable to the remaining birefringent crystalline plates and in a mutually inverse direction.

14 Claims, 5 Drawing Sheets

5,774,264

POLARIZATION INDEPENDENT OPTICAL ISOLATOR

This application is a Continuation of Ser. No. 08/375,297, filed Jan. 20, 1995, now abandoned.

TECHNICAL FIELD OF THE INVENTION

The present invention generally relates to optical isolators that do not depend upon the optical direction of polarization for optical fiber communications, and more specifically relates to polarization-independent optical isolators having a structure in which polarization dispersion is virtually eliminated by selecting the thickness and optical axis orientations of bireflingent crystalline plates used in the isolator.

BACKGROUND OF THE INVENTION

With recent progress in optical communications that use a semiconductor laser as the signal light source, the heretofore impossible practical application of high speed, high density optical signal transmission in excess of several hundred megahertz has become a reality. Furthermore, owing to recent extensive progress in light amplification technology, an enormous increase in information transmission density has also become possible using optical fibers without optoelectric conversion. Consequently, demand has increased for both optical isolators for insertion between optical fibers, which optical isolators do not depend on the optical direction of polarization, and for technical advancements related to induction methods of the excitation light used for light amplification. Furthermore, there has been a demand to maintain economically low pricing for these devices despite the technological advances embodied therein. In response to these demands, various proposals have been made and some have been put to practical use.

FIG. 2 illustrates a conventional optical isolator in which optical characteristics are not dependent upon the direction of optical polarization, in which the planes of the incident and transmission beams are parallel, and in which optical coupling is relatively easy. This type of optical isolator in which optical characteristics are not dependent upon the direction of optical polarization is hereinafter referred to as a polarization-independent optical isolator. In addition to the advantages noted above, this polarization-independent optical isolator is also advantageous with respect to the number and type of components required to construct such an isolator. Specifically, only two different parts, namely birefringent crystalline plates P21, P22 and P23, and a Faraday rotator F, and required to form the polarization-independent optical isolator shown in FIG. 2.

FIG. 2 also illustrates the polarization dispersion that is associated with the optical isolator and the transmission state of light beams in the forward direction. As noted above, the configuration shows a structure using a Faraday rotator and three birefringent crystalline plates (see Japanese Published, Patent Application No. 51690/85, the contents of which are incorporated herein by reference). However, in the configuration of FIG. 2, since the ordinary and extraordinary beams have different propagation paths, phase shifts occur between the two beams. This phase shift results in a characteristic polarization dispersion of the signal. It is generally desirable that this polarization dispersion induced by the propagation of a beam through the optical isolator used between optical fibers be controlled to 0.2 ps (pico-seconds) below the signal resolution. However, in the case of the configuration in FIG. 2, there is a difference in the beam propagation velocity between the ordinary and extraordinary beams, and therefore polarization dispersion always occurs. This polarization dispersion, when left uncorrected, is unacceptable in optical systems intended for high speed, high density optical communications.

Referring next to FIG. 3, a schematic block diagram of an optical isolator illustrating the use of birefringent crystalline plates for polarization dispersion compensation in a conventional single step configuration is shown. Specifically, in order to solve the polarization dispersion problems noted above with respect to the optical isolator shown in FIG. 2, FIG. 3 shows an example in which birefringent crystal phase adjusting plates, formed so that the beams propagate at a right angle to the optical axis, are placed in the beam propagation paths (see Japanese patent application No. 336563/92, the contents of which are incorporated herein by reference).

The above relationship is described in more detail using the configuration shown in FIG. 2, wherein the thickness of the first birefringent crystalline plate P21 and second birefringent crystalline plate P22 is d, and the thickness of the third birefringent crystalline plate P23 is √2d. As we trace the state of polarization propagation which occurs as a beam is propagated from the first through the third birefringent crystalline plates, it can be seen that first the beam entering at the first birefringent crystalline plate P21 is separated into ordinary and extraordinary beams. Next, the beam is propagated to the second birefringent crystalline plate P22. The optical axis of second birefringent crystalline plate P22 is oriented as a mirror image to first birefringent crystalline plate P21 and is rotated 45° with respect to the beam propagation axis. Therefore, only the extraordinary beam shifts.

Next, since the third birefringent crystalline plate P23 is orientated as a mirror image to second birefringent crystalline plate P22, the beam which had been ordinary up to P22 becomes an extraordinary beam, and the component of the phase delay of the ordinary and extraordinary beams, produced by first birefringent crystalline plate P21 remains. Therefore, when a fourth birefringent crystalline plate P34 (shown in FIG. 3) is inserted in order to compensate for the phase delay of first birefringent crystalline plate P21, the ordinary and extraordinary beams cannot be separated. Consequently, no separation of ordinary and extraordinary beams can occur due to birefringence, and crystal orientations with different beam propagation speeds must be chosen for the ordinary and extraordinary beams. Consequently, as shown in FIG. 3 by fourth birefringent crystalline plate P34, when the direction of the optical axis is perpendicular to the beam propagation axis, all demands are satisfied, which results in parallel plates having crystalline cut surfaces in which the planes of beam velocity of the ordinary and extraordinary beams assume an ellipsoid cross-section.

On the other hand, FIG. 4 shows a schematic block diagram of an optical isolator illustrating a second conventional configuration where polarization dispersion characteristics are compensated for in a two-step configuration. Specifically, the configuration of FIG. 4 results from matching the beam path lengths of the ordinary and extraordinary beams using two 45° Faraday rotators and four birefringent crystalline plates (see Jananese Published, Unexamined Patent Application No. 51214/92, the contents of which are incorporated herein by reference). This configuration enables construction of polarization-independent optical isolators in which the polarization characteristic based on phase difference is sharply reduced to below 0.1 ps.

In the configuration shown in FIG. 4, the birefringent crystalline plates are adjusted and positioned such that the crystalline orientation of the plates does not cause the ordinary and extraordinary beams to converge at the time of propagation to birefringent crystalline plate P41 and birefringent crystalline plate P42 in the first half, but does cause the ordinary and extraordinary beams to converge at the time of propagation to birefringent crystalline plate P43 and birefringent crystalline plate P44 in the latter half. As a consequence, the ordinary and extraordinary beams are recoupled after passing along the same optical path as shown in the diagram and the phase delay is finally cancelled and polarization dispersion does not occur.

However, it is noted that the above examples shown in both FIG. 3 and FIG. 4 require four expensive birefringent crystalline plates, which presents a problem with respect to product pricing, and moreover, the increased number of parts makes assembly of the optical components more cumbersome. Therefore, there is a need for a polarization-independent optical isolator that can reduce or eliminate the polarization characteristic based on phase difference, while still being economical in cost.

SUMMARY OF THE INVENTION

The above problems are solved in the present invention, which is directed to a novel construction for a polarization-independent optical isolator having fiber terminals to facilitate insertion of the optical isolator between optical fibers and in which the polarization dispersion in the isolator described above is reduced or completely disappears. The present invention employs a combination of birefringent crystalline plates where the angle formed by the normal direction and the optical axis of the birefringent crystalline plate for each plate are different. Therefore, a beam entering from the forward direction between a pair of optical fibers can be propagated to the opposing optical fibers without causing a phase delay associated with polarization. This is achieved in the present invention by using the optical path difference and index of refraction difference between the ordinary and extraordinary beams without disturbing the polarization separation caused by the birefringent crystalline plates and recoupling positions.

Furthermore, in polarization dispersion-controlled polarization independent optical isolators, increasing the number of components had previously been used to reduce or eliminate polarization dispersion. The present invention, however, provides an optical isolator configuration in which polarization dispersion is virtually eliminated by selecting the thickness and optical axis orientations of the existing birefringent crystalline plates. Thus simplicity of parts, ease of assembly, and cost reduction for the optical isolator having a small polarization dispersion are realized. Furthermore, the present invention results in an increase in the reliability of propagation signals in a high speed, high density optical communications system to which optical amplification is introduced.

DETAILED DESCRIPTION OF THE PREFERRED EMBODIMENT

To best understand the detailed description of the preferred embodiment, it is necessary to understand the underlying principles of polarization dispersion in optical isolators and more particularly the operation of the conventional components, such as birefringent crystalline plates, used in optical isolators. Therefore, a general description of these concepts is set forth below.

The phase shift based on the index of refraction difference of ordinary and extraordinary beams of birefringent crystalline plates is generally expressed by Equations 1 and 2 shown below, wherein $\omega$ is the angular velocity of the beams, and $t_{ei}$ and $t_o$ are the propagation time of the extraordinary beam and the ordinary beam, respectively.

$$\tau = \omega(t_{ei} - t_o), \quad \omega = 2\pi c/\lambda \tag{1}$$

When $\lambda$ is the beam wave length, the phase delay $\tau$ is expressed by Equation 2 using the relationship shown in Equation 1. In Equation 2, $n_{ei}$ and $n_o$ are the indices of refraction for the extraordinary and ordinary beams and the relationship was derived by assigning d for crystal thickness, c for optical velocity, and $\lambda$ as the optical wavelength.

$$\tau = 2\pi d(n_{ei} - n_o)/\lambda \tag{2}$$

In Equation 2, $n_{ei}$ is dependent on the angle $\theta$ formed by the normal direction of the birefringent crystalline plate and the optical axis of the crystal. When the index of refraction of the extraordinary ray is $n_e$, $n_{ei}$ is derived from the relationship shown by Equation 3 below, which holds with respect to optional angle $\theta$ formed by the direction normal to the birefringent crystalline plate and the optical axis of the crystal.

$$n_{ei} = \frac{n_e - n_o}{\sqrt{n_o^2 \sin^2\theta + n_e^2 \cos^2\theta}} \tag{3}$$

The index of refraction, $n_{ei}$ of the extraordinary beam corresponding to the orientation, and the phase delay, $\delta$, are related as shown below by Equation 4.

$$\delta = t_{ei} - t_o = \frac{d(n_{ei} - n_o)}{c} \tag{4}$$

Figure 1A:
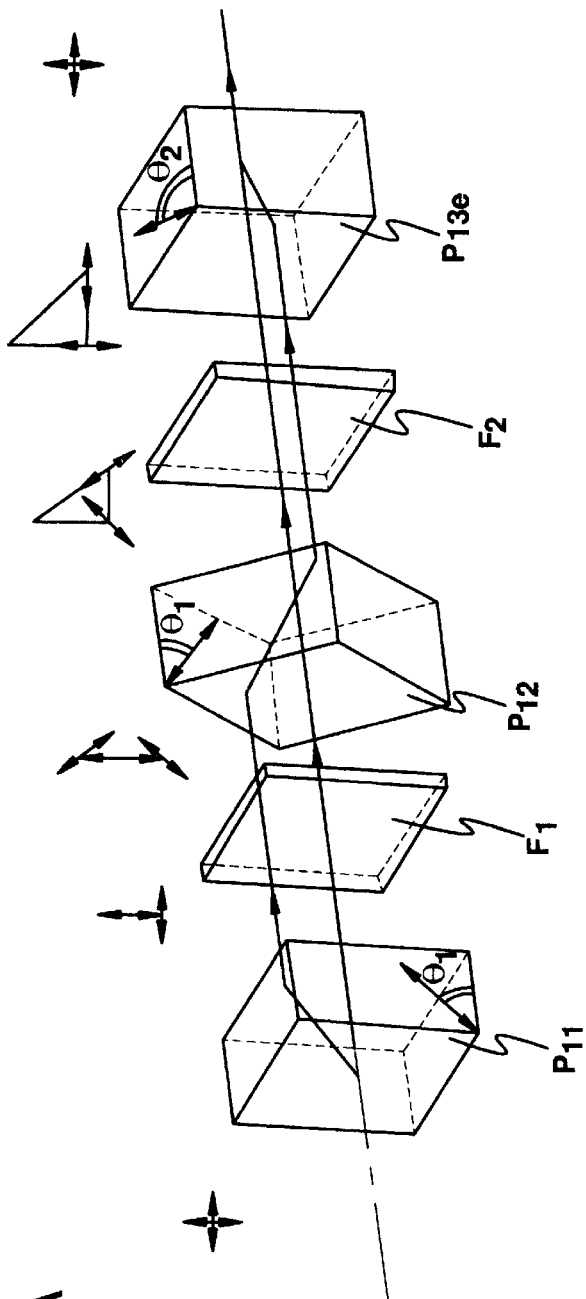
FIGS. 1a and 1b show a schematic block diagram illustrating one embodiment of an optical isolator according to the present invention.
Figure 1B:
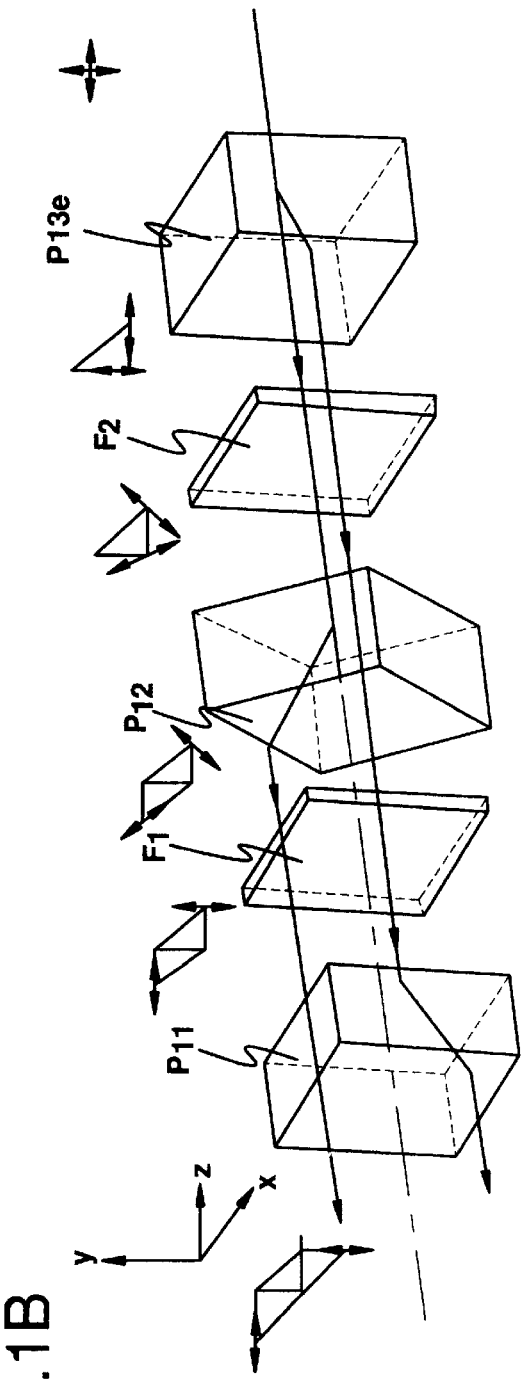

Referring to FIG. 1, a schematic block diagram illustrating one embodiment of an optical isolator according to the present invention is shown. When the direction of beam propagation (direction normal to the birefringent crystalline plate) is along the z axis, the direction from top to bottom of the plane of the paper is the y axis, and the direction perpendicular to the plane of paper is the x axis. Thus, the propagation conditions are: the optical axis is parallel to the yz plane and the incident beam is also parallel to the yz plane and perpendicular to the xy plane.

Figure 5:
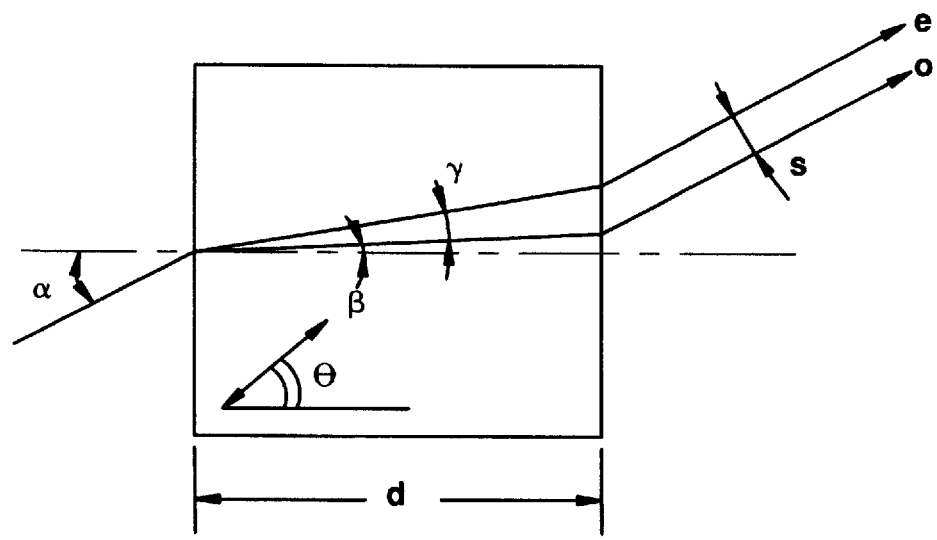
FIG. 5 shows a diagram illustrating the optical paths of a birefringent crystalline plate in accordance with the present invention.

Referring next to FIG. 5, ordinary and extraordinary beam separation width, s, during propagation through a birefringent crystalline plate of thickness d, and the angle, $\theta_{max}$, to yield a maximum beam separation width s are determined from Equations 5 and 6 below.

$$\theta_{max} = \tan^{-1}\frac{n_e}{n_o} \quad (6)$$

$$s = \frac{n_e^2 - n_o^2}{2(n_o^2\sin^2\theta + n_e^2\cos^2\theta)} \, d \cdot \sin 2\theta \cdot \cos\alpha \quad (5)$$

Where, as shown in FIG. 5, $\alpha$ is the angle of incidence to the xy plane. When a polarization-independent optical isolator is inserted in a space where the optical coupling between fibers is formed by a pair of lenses, it is fixed by shifting from the direction normal (z axis) to the xy plane by about several degrees/minutes so that the reflected light at the plane of the terminal will not be incorporated into the fiber, and a cos $\alpha$ component is added. In this case, naturally, the phase delay relationship also changes as shown in Equation 7 below.

$$\delta = \frac{d \cdot \left[\frac{n_{ei}}{\cos\gamma} - \frac{n_o}{\cos\beta}\right]}{c} \quad (7)$$

In Equation 7, $\beta$ is the refraction angle of the ordinary beam when the incident beam propagates to the birefringent crystalline plate, and $\gamma$ is similarly the angle formed by the extraordinary beam and z axis. These parameters are derived by Equations 8 and 9 below, respectively.

$$\beta = \sin^{-1}\left(\frac{\sin\alpha}{n_o}\right) \quad (8)$$

$$\gamma = \tan^{-1}\left(\frac{s}{d\cos\alpha} + \tan\beta\right) \quad (9)$$

In the above relationship, when the angle of incidence $\alpha$ and the separation width s are determined, in order to compensate for a certain phase delay (hereinafter called polarization mode dispersion, or PMD), in accordance with the present invention, the thickness of the birefringent crystalline plate is selected by appropriately changing the cut angle to the optical axis such that it has an equivalent separation width s to cancel the PMD. Since PMD is always dependent on the angle of orientation of the optical axis $\theta$ and plate thickness, it can be adjusted depending on the parameters selected for birefringent crystalline plates during construction of the plates.

For example, devices for separating a normal beam from an extraordinary beam with a birefringent plate generally require minimum plate thickness and maximum separation width $s_{max}$. Therefore, in the case when a wavelength such as, for example, $\lambda = 1.55$ $\mu$m is used in the field of optical communications, and when the indices of refraction of the ordinary and extraordinary beams are denoted as $n_o=2.453$ and $n_e=2.709$ respectively and $\theta_{max}=47.8°$, it can be seen that $s_{max}=0.0999d$, which is about 10% of the thickness of the birefiingent crystalline plates. Needless to say, when the incident beam is projected at an angle of $\alpha$, the PMD can be estimated from the relationship shown in Equation 7.

Figure 2:
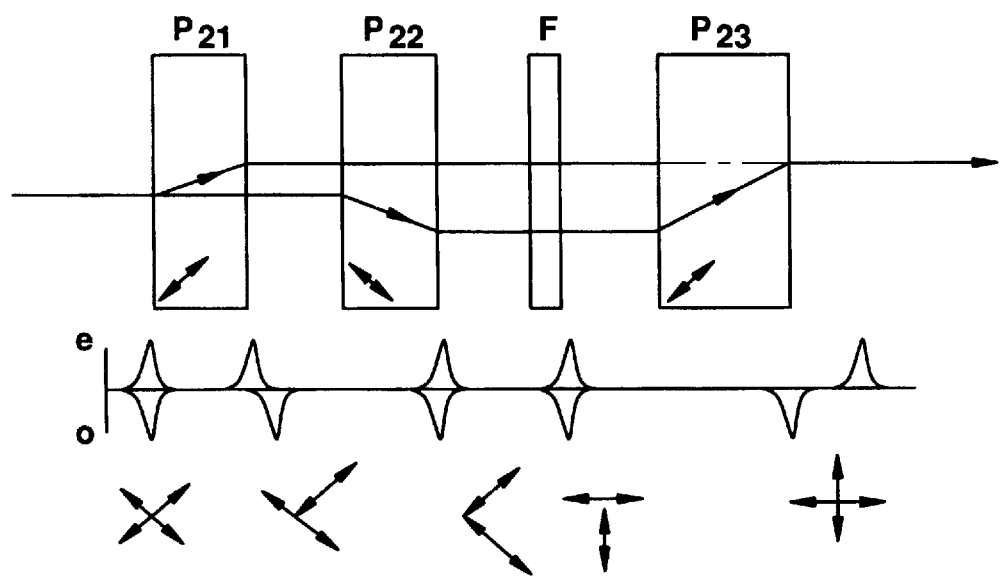
FIG. 2 shows a schematic block diagram illustrating the polarization dispersion of a conventional polarization-independent optical isolator.
Figure 3:
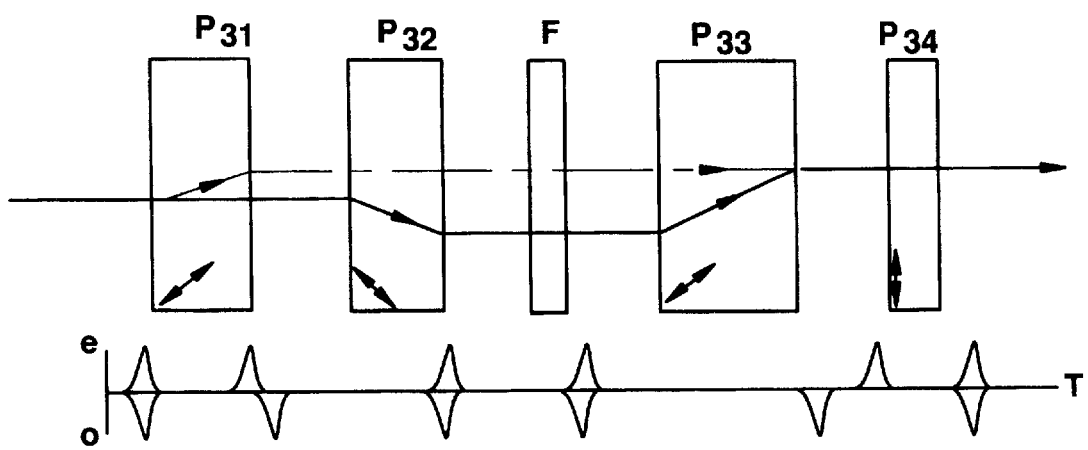
FIG. 3 shows a schematic block diagram illustrating the use of birefringent crystalline plates for polarization dispersion compensation in a conventional single step configuration.

For example, when the present invention is applied to the polarization independent optical isolator constructed as shown in FIG. 2, the ratio of plate thickness for birefringent crystalline plates P21, P22, and P23 in the diagram is 1:1:√2 when birefringent crystalline plate P21 has a thickness of d. In addition, when the respective polarization mode dispersions are denoted as PMD1, PMD2, and PMD3, the total PMD is, as is clear from FIG. 2, PMD=(PMD2+PMD3)−PMD1. In short, the component generated at PMD3 is a residual. Consequently, when the birefringent crystalline plate in which the angle ($\theta_k$) formed by the optical axis of birefringent crystalline plate P21 and the normal line of the birefringent crystalline plates is set in a different orientation from that of birefringent crystalline plates P22 and P23, and such plate is denoted as P21$_e$, and when this P21$_e$ is positioned in place of P21, the condition for minimized total polarization mode dispersion (PMD2+PMD3)=PMD1 is realized.

The above-mentioned conditions can be satisfied when the indices of refraction for extraordinary beams are denoted as $n_{ei}$ for birefringent crystalline plates P22 and P23, $n_{eii}$ for birefringent crystalline plate P21$_e$, and when the plate thickness in the normal direction is designated as $d_i$. At the same time, the beam transmitted through bireflingent crystalline plate P21$_e$ must be expected to isolate ordinary and extraordinary beams of the same orientation and size as those obtained at birefringent crystalline plate P21 during the process of propagation through plate thickness, $d_i$.

Figure 6:
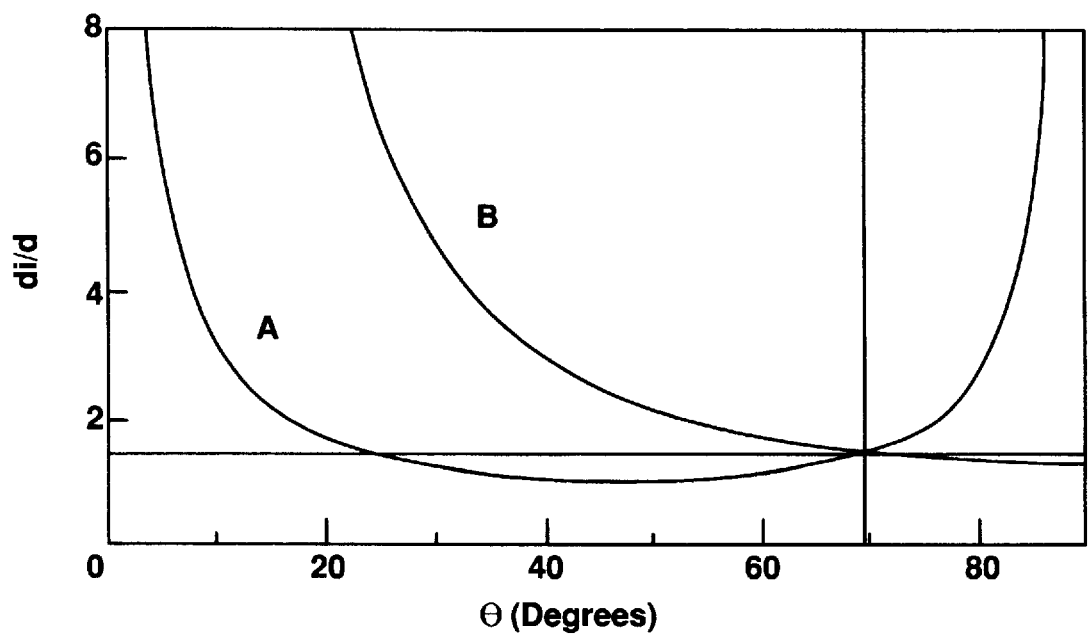
FIG. 6 shows a graph illustrating calculated values showing polarization dispersion compensation points.

Equations 10 and 11 shown below were derived based on the condition that the separation widths of birefringent crystalline plate P21 and birefringent crystalline plate P21$_e$ coincide and that the combined PMD of birefringent crystalline plates P22 and P23 and PMD of birefringent crystalline plate P21$_e$ cancel each other, and $d_i$ is a function of $\theta_k$. $\theta_k$ is derived from the condition that the two equations are equal, and as shown by the intersection of curves A and B in FIG. 6, the angle of the optical axis at the intersection of Equations 10 (curve A) and 11 (curve B) and the thickness of the birefiringent crystalline plate, $d_i$, theoretically exist.

$$\frac{d_i}{d} = \frac{P}{O} \cdot \frac{K}{L} \quad (10)$$

$$\frac{d_i}{d} = (1+\sqrt{2}) \cdot \frac{\frac{n_{ei}}{\cos\gamma} - \frac{n_o}{\cos\beta}}{\frac{n_{eii}}{\cos\gamma_i} - \frac{n_o}{\cos\beta}} \quad (11)$$

Where:

$K = n_o^2\sin^2\theta_k + n_e^2\cos^2\theta_k$ $L = n_o^2\sin^2\theta + n_e^2\cos^2\theta$ $O = \cos\theta_k \cdot \sin\theta_k$ $P = \cos\theta \cdot \sin\theta$ $Q = n_e^2 - n_o^2$ $\gamma_i = \tan^{-1}\left[\frac{Q \cdot O}{K} + \tan\left(\sin^{-1}\left(\frac{\sin\alpha}{n_o}\right)\right)\right]$ $\gamma = \tan^{-1}\left[\frac{Q \cdot P}{L} + \tan\left(\sin^{-1}\left(\frac{\sin\alpha}{n_o}\right)\right)\right]$ $n_{eii} = \frac{n_e \cdot n_o}{\sqrt{K}}$ $n_{ei} = \frac{n_e \cdot n_o}{\sqrt{L}}$ $\beta = \sin^{-1}\left(\frac{\sin\alpha}{n_o}\right)$ When the above relationship is further generalized, three birefringent crystalline plates, $P_i$ (i=l, m, n) are generally required in this invention, and the angle of the optical axis orientations are $\theta_i$ (i=l, m, n). At least one of $\theta_i$ must be an angle different from the other $\theta_j$. For example, when $\theta_l=\theta_n$, $\theta_n \neq \theta_l = \theta_m$ or $\theta_n \neq \theta_m$, and $\theta_l \neq \theta_m$ are conceivable. In other words, the first essential element is that not all the angles of orientation are identical.

Meanwhile, being an optical isolator, the beams separated into ordinary and extraordinary beams by the first birefringent crystalline plate must be recoupled. The respective separation widths $s_i$ (i=l, m, n) result in the following relationship:

$$s1 = \sqrt{2}\ s2 = \sqrt{2}\ s3 \tag{12}$$

Here, i was used for convenience, and intrinsically, the separation widths in the three birefringent crystalline plates must have the proportional relationship of $1:1:\sqrt{2}$. In addition to these two conditions, the thicknesses of the birefringent crystalline plates, $d_l$, $d_m$, and $d_n$ are determined such that $PMD_l + PMD_m = PMD_n$.

When the following variables are defined as:
$u = n_o^2 n_e^2 \cos^2\theta\ i - n_o^2 \sin^2\alpha\ i$
$v = -2n_o^2 n_e^2 \cos\theta\ i \cdot \sin\theta\ i$
$w = n_o^2 n_e^2 \sin^2\theta\ i - n_{ei}^2 \sin^2\alpha\ i$
with $$n_{ei} = \frac{n_o \cdot n_e}{\sqrt{n_e^2 \cos^2\theta_{ii} + n_o^2 \sin^2\theta_{ii}}} \tag{13}$$

then the following Equation 14 defines $\theta_{ii}$ $$\theta_{ii} = \tan^{-1}\left(\frac{-v + \sqrt{v^2 - 4uw}}{2u}\right) \tag{14}$$

Therefore, one primary feature of the present invention is to determine $\theta_i$ and $d_i$ which are related from the relationship of polarization dispersions to $\theta_{ii}$ as follows:

$$PMD_i = \frac{d_i}{c} \cdot \left[\frac{n_{ei}}{\cos(\theta_{ii}-\theta_i)} - \frac{n_o}{\cos\left(\sin^{-1}\frac{\sin\alpha_i}{n_o}\right)}\right] \tag{15}$$

$$s_i = \tag{16}$$
$$d_i\left[\tan\beta_i \cdot \cos\alpha_i + \tan\left(\theta_i - \tan^{-1}\left(\frac{n_o^2}{n_e^2}\tan\theta_{ii}\right)\right) \cdot \cos\alpha_i\right]$$

In implementing the substance of the present invention discussed in detail above, a plurality of diverse arrangements are conceivable as combinations for the birefringent crystalline plates and for combining their normal directions and optical axis. However, the following fundamental principals must be followed in fabricating a polarization-independent optical isolator according to the present invention:

(1) the optical axis orientation of at least one birefringent crystalline plate must be different from the optical axis orientation of the remaining birefringent crystalline plates;

(2) the polarization mode dispersion (PMD), which is induced when the beam propagates through the birefringent crystalline plate having a different optical axis orientation involved in (1) above, must be equal to the dispersion rate of the polarization mode dispersion attributable to the remaining birefringent crystalline plates and the dispersion directions must be in mutually inverse directions; and (3) the device must be provided with optical isolator functions to retain an optical non-reciprocal effect—with scarcely no forward loss, and more than 30 dB reverse direction loss, which are essential conditions and which can be obtained from the above essential elements listed in (1) and (2).

The relationship of these parameters and their function in an optical isolator according to the present invention will be further illustrated with reference to the following non-limiting examples.

EXAMPLE 1

FIG. 1 is a construction of one embodiment of the polarization-free optical isolator according to the present invention. The basic configuration employs rutile crystals as birefringent crystalline plates P11, P12, and P13$_e$. The cut angles (angle formed between the normal and the optical axis directions of the plane of the plate) of the birefringent crystalline plates are $\theta_1=47.8°$ for P11 and P12 and $\theta_2=69.8°$ for P13$_e$ with respect to the optical axis of the rutile crystals. The rutile crystal is a positive single axis crystal, and the orientation of the crystal optical axis is positioned in the direction shown in FIG. 1. Respective dimensions are 3 mm×3 mm with a thickness of 1.41 mm for P11, and the cross-sectional dimension for P12 is 3 mm×3 mm with a thickness of $\sqrt{2}$times that of P11, which results in a thickness of 2 mm. The thickness of P13$_e$ was 2.02 mm, a value estimated from Equations 10 and 11 discussed in detail above.

For the Faraday rotators, F1 and F2, Bi-substituted rare earth iron garnets grown on a GGG substrate using the LPE method were used. The cross-sectional dimension was 3 mm×3 mm; the thickness approximately 350 $\mu$m; and the wavelength approximately $\lambda=1550$ nm. Since the polarization dispersibility using a Faraday rotator is very weak, only the contribution at the birefringent crystalline plates is estimated. The polarization dispersion produced by the incident beam perpendicular to the birefringent crystalline plates P11 and P12 with a cut angle of 47.8° to the optical axis results in an index of refraction of the extraordinary beam, $n_{e'}$, as $n_{e'}=2.584$ and $\delta=1.565\times10^{-12}$s, i.e. approximately 1.56 ps. Similarly, the optical axis orientation of P13$_e$ is 69.8°, and $n_{eii}=2.674$, $\delta=1.533\times10^{-12}$s, i.e. approximately 1.53 ps results. Thus, a polarization dispersion of approximately $\Delta\delta=0.02$ ps results.

Figure 4:
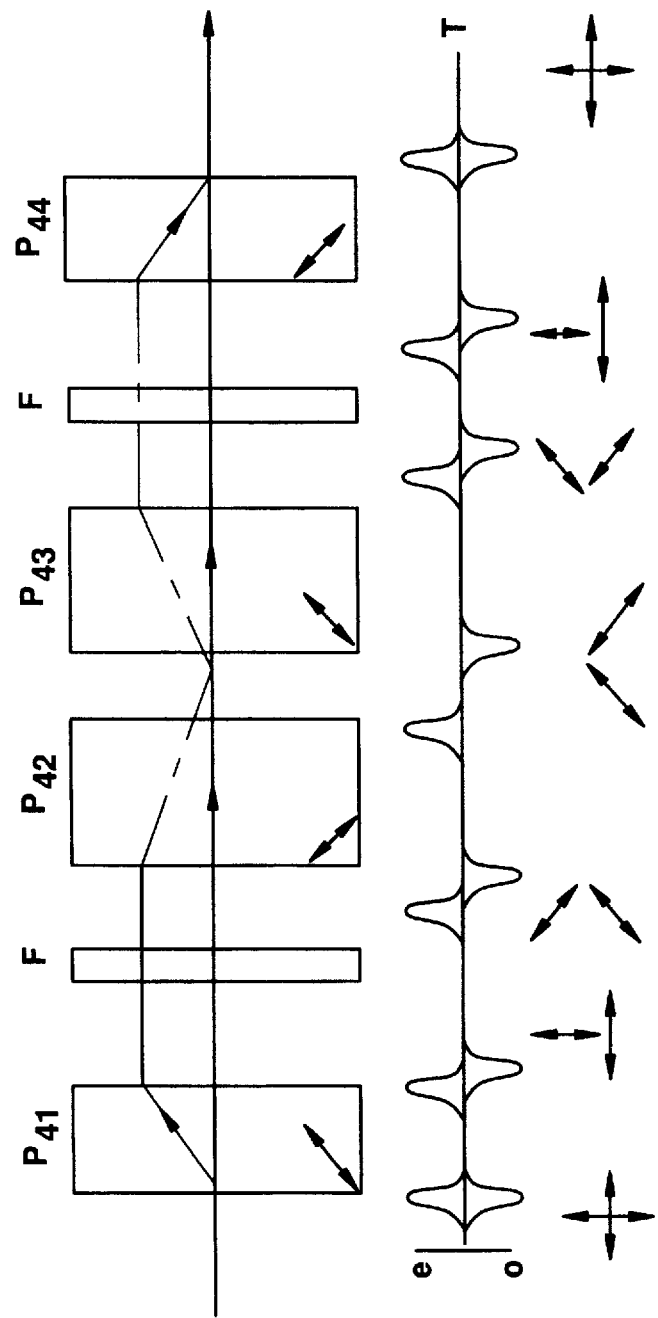
FIG. 4 shows a schematic block diagram illustrating a conventional configuration where polarization dispersion characteristics are considered in a two-step configuration.

The actual measurement of polarization dispersion using an interference light intensity alternating current synchronous detection method was 0.01 ps, which was approximately the value anticipated. Naturally, based on the equation for polarization dispersion, if the thickness of the birefringent crystalline plates decreases, the suppression of polarization dispersion will be proportionally weaker. However, as an optical isolator, as the separation width of the beam controlling the reverse direction insertion loss becomes smaller, the resulting deterioration in the extinction ratio becomes meaningless. At this time, the insertion loss of the optical isolator was 0.6 dB, and the extinction ratio was 68.4 dB. Basically, the present invention is a two-step construction using two Faraday rotators, but the coupling efficiency of the beams are equal to that of a conventional construction. Moreover, the number of components is fewer than in the construction shown in FIG. 4, and since it can be configured so that the directions of magnetization are opposite to each other, both temperature and wavelength characteristics can be achieved over broader zones.

EXAMPLE 2

In order to compare the conventional configuration of FIG. 2 and the configuration of the present invention, two linds of polarization-independent optical isolators were constructed. Rutile crystals were used for the birefringent crystalline plates, and for Faraday rotators, as in Example 1, Bi-substituted rare earth iron garnet film was used. Of course, YIG (yttrium iron garnet) cut from bulk crystal could also be used.

Figure 7A:
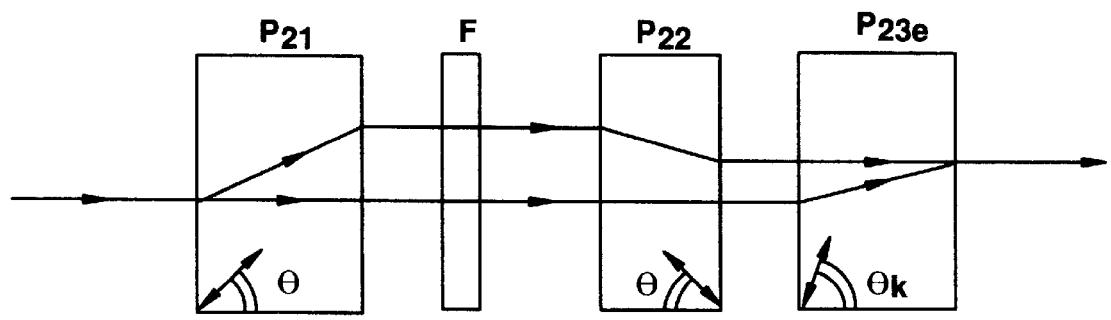
FIGS. 7a and 7b show another schematic block diagram illustrating another embodiment of an optical isolator according to the present invention.
Figure 7B:
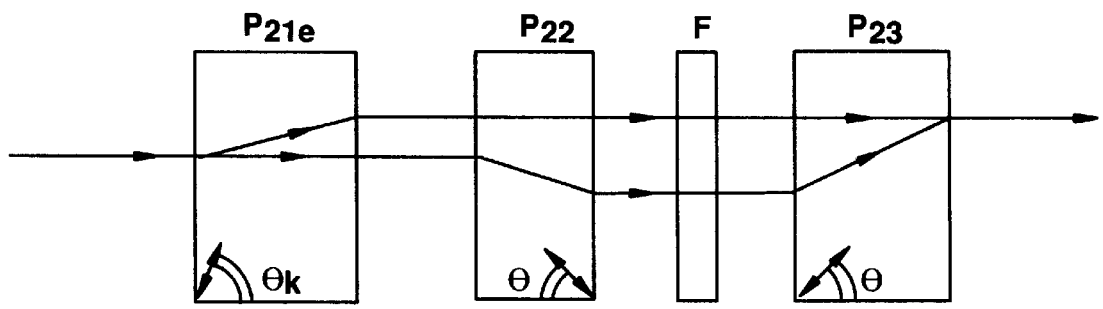

The difference between the two configurations is the substitution of P21 in FIG. 2 with $P21_e$, according to the present invention. Table 1 shows a tabulated comparison of respective configurations and results of measured polarization dispersion. This example also used a single birefringent plate in which the optical axis orientation of the birefringent crystalline plate was set at 69.8°. Compared with the conventional method, the polarization dispersion characteristics were sharply suppressed. The exact forward and reverse directions of the beams depend upon the specific assembly order and method and various different orders and methods would be readily apparent to one of skill in the art from the above description. Several possible arrangements are shown for example in FIG. 7 (a) and (b).

TABLE 1

| Birefringent | Conventional single step construction | | | Single step construction according to the present invention | | |
|---|---|---|---|---|---|---|
| plate number | P21 | P22 | P23 | P21e | P22 | P23 |
| Angle of incident beam | 2.6° | 0 | 0 | 2.6° | 0 | 0 |
| Angle of optical axis orientation | 47.8° | 47.8° | 47.8° | 69.8° | 47.8° | 47.8° |
| Thickness of crystalline plate | 1.41 mm | 1.41 mm | 2.00 mm | 2.02 mm | 1.41 mm | 2.00 mm |
| Polarization dispersion value | | 0.9 ps | | | 0.01 ps | |
| Insertion loss | | 0.4 dB | | | 0.5 dB | |
| Extinction characteristic | | 45.3 dB | | | 43.8 dB | |

EXAMPLE 3

Table 2 shows a configuration in which the conditions for the birefringent crystalline plate were recombined using as an example the single step construction polarization-independent optical isolator in Example 2 together with the calculated plate parameters. Example 31 illustrates an isolator in which the optical axes of the two birefringent crystalline plates are set at 45°, and the birefringent crystalline plate for PMD compensation, at 67.8°. Example 32 is a combination in which all optical axis orientations of the bireflingent crystalline plates are different. In every case, in accordance with the present invention, the desired performance was obtained with respect to the optical isolator characteristics. Consequently, the bireflingent crystalline plate combination used depends on other design factors, for example, whether the priority is to shorten the beam propagation distance and increase optical coupling between fibers, or whether the priority is to enlarge the separation widths of ordinary and extraordinary beams in order to raise extinction characteristics, or minimize the volume of the birefringent crystalline plates used because of price restrictions, etc., and any number of unconstrained configuration can be freely designed in accordance with the present invention.

TABLE 2

| Birefringent | Example 31 | | | Example 32 | | |
|---|---|---|---|---|---|---|
| plate number | P21 | P22 | P23e' | P21e' | P22 | P23e" |
| Angle of incident beam | 0 | 0 | 2.60 | 0 | 0 | 2.0° |
| Angle of optical axis orientation | 45° | 45° | 67.8° | 30° | 47.8° | 63.1° |
| Thickness of crystalline plate | 2.00 mm | 1.41 mm | 1.88 mm | 2.44 mm | 1.41 mm | 1.65 mm |
| Polarization dispersion value | | 0.01 ps | | | 0.01 ps | |
| Insertion loss | | 0.6 dB | | | 0.2 dB | |
| Extinction characteristic | | 42.9 dB | | | 45.5 dB | |

We claim:

1. A polarization-independent optical isolator which consists of one Faraday rotator and three birefringent crystalline plates, at least one of said three birefringent crystalline plates having an orientation of a crystal optical axis different from an orientation of a crystal optical axis of the other birefringent crystalline plates, said orientation of said crystal optical axis of said at least one of said birefringent crystalline plates arranged to cancel a polarization phase delay arising from different propagation rates between ordinary and extraordinary rays and induced by the propagation of the beams through said other birefringent crystalline plates, wherein said polarization phase delay is suppressed to less than 0.05 picoseconds.

2. The polarization-independent optical isolator of claim 1 wherein said other birefringent crystalline plates comprise:

a first and second birefringent crystalline plate, said first and second birefringent crystalline plates having the same orientation of the crystal optical axis of said first and second birefringent crystalline plates to a direction normal to the plane of the plates, said orientation of the crystal optical axis of said first and second birefringent crystalline plates set to the direction having the maximum split width between ordinary and extraordinary rays, and said first and second birefringent crystalline plates each having a thickness in said direction normal to the plane of said plates, wherein said thickness of said first plate and said thickness of said second plate are related by a $\sqrt{2}:1$ ratio.

3. A polarization-independent optical isolator which consists of a Faraday rotator with three birefringent crystalline plates having thickness ratios of $\sqrt{2}:t:1$ or $\sqrt{2}:1:t$ and said Faraday rotator located between the first and the second said birefringent plates, wherein the said birefringent plate thickness indicated by t having an orientation of a crystal optical axis different from an orientation of a crystal optical axis of the other birefringent crystalline plates, said thickness of the said birefringent plate thickness indicated by t having following relation, $$t = (1 + \sqrt{2}) \frac{\dfrac{n_{ei}}{\cos\gamma} - \dfrac{n_o}{\cos\beta}}{\dfrac{n_{eii}}{\cos\gamma i} - \dfrac{n_o}{\cos\beta}}$$

in which $n_o$ and $n_{ei}$ are refractive indexes of ordinary and extraordinary beams and $\beta$ and $\gamma$ are refractive angle both ordinary and extraordinary beams on said the other birefringent crystalline plates, $n_{eii}$ and γ i are the refractive index and refractive angle of the extra-ordinary beam on said birefringent plate thickness indicated by t, arranged to cancel a polarization phase delay induced by said the other birefringent crystalline plates.

4. The polarization independent optical isolator of claim 3 wherein said polarization phase delay is less than 0.05 picoseconds.

5. The polarization independent optical isolator of claim 4, wherein said polarization phase delay arising from different propagation rates between ordinary and extraordinary rays and induced by the propagation of the beams through said other birefringent crystalline plates are suppressed to less than 0.05 picoseconds.

6. A polarization-independent optical isolator which consists of a first birefringent plate, a first Faraday rotator and a second birefringent plate, a second Faraday rotator and a third birefringent plate wherein said first, second and third birefringent plates have a thickness ratio of t:√2:1 wherein said first birefringent plate has an orientation of a crystal optical axis different from said other two birefringent plates, said thickness of said birefringent plate thickness indicated by t having following relation, $$t = (1+\sqrt{2})\frac{\frac{n_{ei}}{\cos\gamma}-\frac{n_o}{\cos\beta}}{\frac{n_{eii}}{\cos\gamma i}-\frac{n_o}{\cos\beta}}$$

in which $n_o$ and $n_{ei}$ are refractive indexes of ordinary and extraordinary beams and β and γ are refractive angle both ordinary and extraordinary beams on said the other birefringent crystalline plates, $n_{eii}$ and γ i are the refractive index and refractive angle of the extra-ordinary beam on said birefringent plate thickness indicated by t, arranged to cancel a polarization phase delay induced by said other birefringent crystalline plates.

7. The polarization independent optical isolator of claim 6 wherein said polarization phase delay arising from different propagation rates between ordinary and extraordinary rays and induced by the propagation of the beams through said other birefringent crystalline plates are suppressed to less than 0.05 picoseconds.

8. A polarization-independent optical isolator consists of at least one Faraday rotator with three birefringent crystalline plates, at least one of said three birefringent crystalline plates having an orientation of a crystal optical axis different from an orientation of a crystal optical axis of the other birefringent crystalline plates, said orientation of said crystal optical axis and a thickness of said at least one birefringent crystalline plate arranged to cancel a polarization phase delay induced by the propagation of a beam through said other birefringent crystalline plates.

9. The polarization independent optical isolator of claim 8 wherein said polarization phase delay is less than 0.05 picoseconds.

10. The polarization independent optical isolator of claim 9, wherein said polarization phase delay arising from different propagation rates between ordinary and extraordinary rays and induced by the propagation of the beams through said other birefringent crystalline plates are suppressed to less than 0.05 picoseconds.

11. A polarization independent optical isolator which consists of a Faraday rotator with three birefringent crystalline plates having thickness ratios of t:1:√2 or 1:t:√2 and said Faraday rotator located between the second and the third said birefringent plates, wherein the said birefringent plate thickness indicated by t having an orientation of a crystal optical axis different from an orientation of a crystal optical axis of the other birefringent crystalline plates, said thickness of the said birefringent plate thickness indicated by t having following relation, $$t = (1+\sqrt{2})\frac{\frac{n_{ei}}{\cos\gamma}-\frac{n_o}{\cos\beta}}{\frac{n_{eii}}{\cos\gamma i}-\frac{n_o}{\cos\beta}}$$

in which $n_o$ and $n_{ei}$ are refractive indexes of ordinary and extraordinary beams and β and γ are refractive angle both ordinary and extraordinary beams on said the other birefringent crystalline plates, $n_{eii}$ and γ i are the refractive index and refractive angle of the extra-ordinary beam on said birefringent plate thickness indicated by t, arranged to cancel a polarization phase delay induced by said the other birefringent crystalline plates.

12. A polarization-independent optical isolator which consists of a first birefringent plate, a first Faraday rotator and a second birefringent plate, a second Faraday rotator and a third birefringent plate wherein said first, second and third birefringent plates have a thickness ratio of √2:1:t wherein said first birefringent plate has an orientation of a crystal optical axis different from said other two birefringent plates, said thickness of said birefringent plate thickness indicated by t having following relation, $$t = (1+\sqrt{2})\frac{\frac{n_{ei}}{\cos\gamma}-\frac{n_o}{\cos\beta}}{\frac{n_{eii}}{\cos\gamma i}-\frac{n_o}{\cos\beta}}$$

in which $n_o$ and $n_{ei}$ are refractive indexes of ordinary and extraordinary beams and β and γ are refractive angle both ordinary and extraordinary beams on said the other birefringent crystalline plates, $n_{eii}$ and γ i are the refractive index and refractive angle of the extra-ordinary beam on said birefringent plate thickness indicated by t, arranged to cancel a polarization phase delay induced by said the other birefringent crystalline plates.

13. A polarization-independent optical isolator which consists of two Faraday rotators and three birefringent crystalline plates, at least one of said three birefringent crystalline plates having an orientation of a crystal optical axis different from an orientation of a crystal optical axis of the other birefringent crystalline plates, said orientation of said crystal optical axis of said at least one of said birefringent crystalline plates arranged to cancel a polarization phase delay arising from different propagation rates between ordinary and extraordinary rays and induced by the propagation of a beam through said other birefringent crystalline plates, wherein said polarization phase delay is suppressed to less than 0.05 picoseconds.

14. The polarization-independent optical isolator of claim 13 wherein said other birefringent crystalline plates comprise:
   a first and second birefringent crystalline plate, said first and second birefringent crystalline plates having the same orientation of the crystal optical axis of said first and second birefringent crystalline plates to a direction normal to the plane of the plates, said orientation of the crystal optical axis of said first and second birefringent crystalline plates set to the direction having the maximum split width between ordinary and extraordinary rays, and said first and second birefringent crystalline plates each having a thickness in said direction normal to the plane of said plates, wherein said thickness of said first plate and said thickness of said second plate are related by a √2:1 ratio.

* * * * *